United States Patent [19]

Johnson

[11] Patent Number: 4,470,564
[45] Date of Patent: Sep. 11, 1984

[54] TUG

[76] Inventor: Phillip L. Johnson, 705 Vesta St., Inglewood, Calif. 90302

[21] Appl. No.: 476,211

[22] Filed: Mar. 17, 1983

[51] Int. Cl.$^3$ .............................................. B64F 1/04
[52] U.S. Cl. .................................... 244/50; 180/904; 280/3; 280/503
[58] Field of Search ............ 244/50; 180/14 C, 14 E, 180/74; 280/3, 255, 253, 258, 503, 246; 294/115

[56] References Cited

U.S. PATENT DOCUMENTS

| | | | |
|---|---|---|---|
| 135,309 | 1/1873 | Bell | 280/3 |
| 1,614,764 | 1/1927 | Rowell | 280/3 |
| 2,391,608 | 12/1945 | Wood | 280/503 |
| 2,409,552 | 10/1946 | Donnellan | 180/14 C |
| 2,436,199 | 2/1948 | Cartmill | 280/246 |
| 2,944,837 | 7/1960 | Fotheringham | 280/503 |
| 2,949,972 | 8/1960 | Wirkkala | 180/74 |
| 2,994,541 | 8/1961 | Dobbins | 180/14 C |
| 3,025,922 | 3/1962 | Savidge | 180/74 |
| 3,937,290 | 2/1976 | Benning | 180/14 C |

Primary Examiner—Galen L. Barefoot
Attorney, Agent, or Firm—Herzig, Schaap & Yanny

[57] ABSTRACT

A lightweight hand-operated aircraft tug for small aircraft includes a main frame upon which a drive drum is movably mounted for engagement with the wheel of an aircraft. A reversible pawl and rachet or an equivalent device controls the direction of rotation of the drum. A lever arm controls the engagement and disengagement of the drum with the aircraft wheel. A pair of axle-engaging inserts are associated with the main frame of the tug so as to be engageable with the axle of the aircraft when the drum is driven into engagement with the wheel by the operation of the lever arm.

19 Claims, 5 Drawing Figures

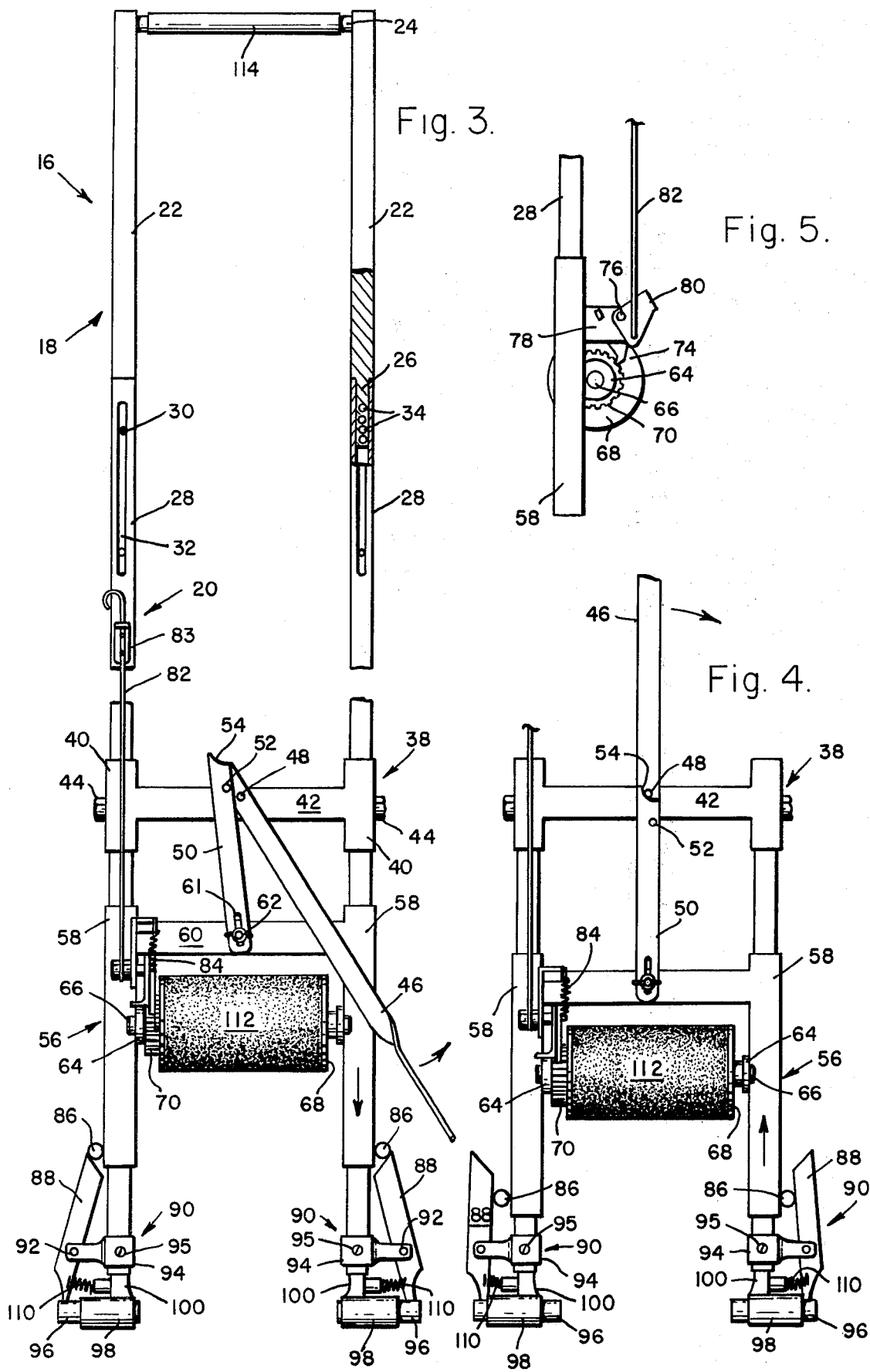

TUG

BACKGROUND OF THE INVENTION

1. Field of the Invention.

The present invention relates generally to tugs utilized for moving aircraft when on the ground, and more particularly to a lightweight, hand-operated, aircraft tug which may be utilized by one individual to move and steer an aircraft when it is on the ground and not under engine power.

2. Description of the Prior Art.

Typically, the operator of an aircraft is faced with the problem of maneuvering his aircraft when it is on the ground and not under engine power, into and out of hangars and tie-down locations. Such operations require delicate maneuvering of the aircraft in the often cramped quarters which must be traversed without bumping into other aircraft. Typically, aircraft operators have been offered one of two alternative techniques for maneuvering aircraft into docking locations.

The first technique involves manually pushing the craft by putting shoulder to wing and physically maneuvering the aircraft across the ground to the desired spot. While in many instances this is a satisfactory technique, with heavier aircraft this technique is not always feasible. The manual pushing operation also requires more than one person since it is difficult to both steer and push an aircraft, even when the aircraft is of the lighter variety. In this same vein, the solo pilot does not have the assistance of passengers or copilots to help him maneuver the aircraft on the ground to docking locations. Since it is nearly impossible for the solo pilot to perform these manual pushing and steering operations himself, he is typically required to enlist the assistance of a ground crew at the airport to maneuver his craft to the docking locations. This oftentimes runs into needless expense and waiting time. It should also be realized that during operation of an aircraft at remote locations, ground crews are not often available to assist the solo pilot who must still overcome the maneuvering problems to properly tie the craft down during periods of nonuse.

The alternative to the manual maneuvering techniques described above is the use of motorized tugs which have ground traversing wheels and supporting platforms for the nose-wheel of the aircraft so as to make maneuvering of the craft on the ground by a single individual more feasible. Various forms of motorization may be utilized such as AC and DC electric motors and also gasoline engines which drive the ground traversing wheels of the tug. This type of device is, however, extremely heavy and bulky because of the additional mechanical equipment involved. These factors make it very impractical to stow such devices in the plane so that the solo pilot will have them available when he needs them. The additional weight involved with these devices also makes it undesirable to stow them aboard an aircraft, since flight weight is a critical factor. Additionally, with the AC electric motorized versions it must also be realized that a source of electric power is not always available, thus rendering the AC tugs unusable in many situations. If physical injury to the pilot or the aircraft is to be avoided, additional costly and time-inefficient lifting equipment must also be used to elevate the nose wheel until the supporting platform of the tug is thereunder.

SUMMARY OF THE INVENTION

The present invention thus provides for an extremely lightweight, hand-operated, aircraft tug which may be utilized by a single individual to easily, delicately and safely steer and move an aircraft while on the ground and not under engine power. The hand-operated aircraft tug of the present invention is extremely compact, lightweight and may be easily and practically carried aboard the aircraft during flight operations without sacrificing passenger and cargo weight capabilities. The tug of the present invention, even motorized versions, does not require additional lifting equipment.

More particularly the lightweight hand-operated aircraft tug of the present invention includes a lightweight mainframe to which is reciprocally mounted a drum carriage having a rotatable nosewheel engaging drum. A reversible pawl and ratchet assembly is associated with the drum to control the direction of rotation thereof and thus permit either forward or backward movement of the plane. A reversible motor, chain and sprocket wheel can be used in place of the pawl and ratchet. A two-piece lever assembly is secured to the main frame and can be connected with the drum carriage so as to control reciprocation of the drum carriage, and therefore the drum, to permit engagement of the drum with the nosewheel of the aircraft. The relative positions of the lever and the drum carriage may be adjusted so as to permit accommodation of nosewheels of different radii and guarantee satisfactory engagement of the drum with the wheel. The drum carriage is provided with a cam surface which engages a ramped lever. The ramped lever is pivotably interconnected to the main frame and also operably associated with a nosewheel axle engaging insert so that movement of the lever to place the drum in engagement with the wheel also drives the insert into the hollow wheel axle end to fix the aircraft tug relative to the center of rotation of the nose wheel and the landing gear upright support. Thus reciprocal movement of the hand operated tug permits movement of the aircraft and lateral movement of the tug permits steering thereof—all by a single individual. The ramped lever is spring-biased so that when the drum is moved out of the wheel engagement position, the axle engaging insert automatically retracts to a position where it will not engage the nosewheel axle.

BRIEF DESCRIPTION OF THE DRAWINGS

A better understanding of the present invention may be had from a consideration of the following detailed description taken in conjunction with the accompanying drawings in which:

FIG. 3 is a partially fragmented elevational view of the aircraft tug of the present invention in a first position;

FIG. 4 is an elevational view of a portion of the aircraft tug of FIG. 3 in a second position; and FIG. 5 is a side elevational view of a reversible pawl and rachet which is utilized with the aircraft tug of the present invention.

DETAILED DESCRIPTION OF THE PREFERRED EMBODIMENT

Figure 1:
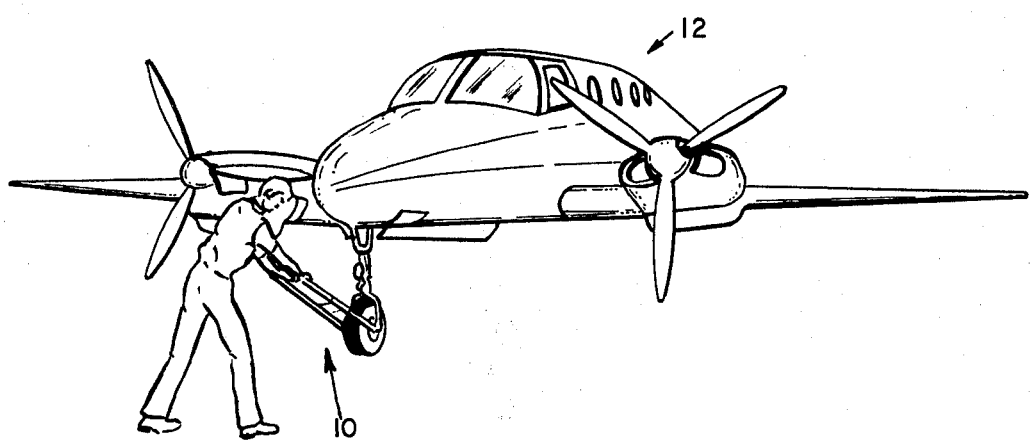
FIG. 1 is a perspective view of a light weight hand operated aircraft tug according to the present invention shown in coupled relationship with an aircraft.

Referring now to the drawings, there is shown a hand-operated aircraft tug 10 according to the present invention for use with an aircraft 12. The tug 10 includes a two-piece main frame 16 having an upper generally rigid frame portion 18 and a lower frame portion 20. The upper frame portion 18 includes spaced parallel extensions 22 fixed relative to each other by a suitable cross member 24 which is secured to the spaced parallel extensions 22 by any suitable means such as by welding or bolts. The lower ends of the parallel extensions 22 include projections 26 of reduced size for insertion into hollow lower frame spaced parallel extensions 28. The upper and lower frame portions 18 and 20 are intersecured by insertion of rivets or studs 30, which are secured to biasing elements 32, into apertures, as at 34, which extend through lower frame spaced parallel extensions 28 and projections 26 (FIG. 3). It should be noticed that a plurality of apertures 34 may be provided in the extensions 28 so that a telescoping effect may be achieved. A variety of telescoping arrangements may be utilized.

A lever arm carriage 38 includes spaced sleeve portions 40 interconnected by cross member 42. Cross member 42 is suitably welded to sleeve portions 40 to provide a stable structure. The inner diameter of sleeve portions 40 is slightly larger than the outside diameter of lower frame spaced parallel extensions 28 so as to allow sliding movement of the lever carriage thereon. The lower frame spaced parallel extensions 28 are provided with suitable threaded apertures (not shown in the drawings) and spaced sleeve portions 40 are provided with unthreaded apertures so that when the lever arm carriage 38 is suitably positioned bolts 44 may be inserted therein to secure the lever carriage 38 in a desired relationship with respect to spaced parallel extensions 28 and provide a rigid and a secured structure.

A lever arm 46 is pivotally secured by suitable means to pivot about pin 48, which is inserted in cross member 42 of the lever arm carriage 38. A push rod 50 is pivotally secured to lever arm 46 by pin 52 which extends through apertures in lever arm 46 and in push rod 50, so as to cause generally linear movement of push rod 50 with rotation of lever arm 46 about its pivot point. The pushrod 50 is provided with a lip 54 which engages pin 48 to constrain the movement of lever arm 46 and pushrod 50.

The present invention also includes a drum carriage assembly 56 which includes two long metal spaced parallel sleeves 58. The sleeves 58 are designed so that their inner openings permit reciprocation of the drum carriage 56 on lower frame extensions 28. The sleeves 58 are maintained in a fixed relative relationship by a cross member 60 which is welded to both sleeves 58. The push rod 50 is provided at its end opposite to its point of pivotal interconnection with lever arm 46, with an elongated longitudinal slot 61 which receives a pin 62. The pin 62 is fixidly but removably journalled in cross member 60 so as to adjustably fix the push rod 50 with respect to the cross member 60 and therefore the drum carriage 56 but permit slight rotation of the push rod 50 with pin 62. Thus the pin 62 accomodates slight rocking movement of the push rod 50 as a result of action of lever arm 46 and the slot 61 is provided to allow for adjustment of the relative positions of the push rod and drum carriage into a variety of securable positions. It should be understood however, that a suitably stiff and adapted turnbuckle can be used in place of push rod 50 to accomplish the desired results, without the necessity of slot 61.

The sleeves 58 of the drum carriage 56 are provided with extended lobes 64 having apertures therethrough. The lobes are welded or otherwise secured to the sleeves 58. Extending through the apertures of the lobes 64 and suitably secured thereto for rotation is a drum axle 66. Extending across the drum carriage is a drum 68 which is concentric about the axle 66 and fixed relative thereto for rotation therewith. To one side of the drum is provided concentrically about the axle 66, a rachet wheel 70 which is securely fixed relative thereto for rotation.

As seen in FIG. 5, a reversible pawl 74 is provided and secured, as by pin 76, to be rotatable to control the direction of rotation of drum 68 in a manner well known in the art. Pin 76 is suitably journalled in support 78 which is secured to sleeve 58 as by welding. Crank 80 is similarly fixed to pin 76 for constrained rotation therewith and operably associated with rod 82 so that linear motion of the rod 82 can be utilized to change the condition of pawl 74 and thus control the direction of rotation of drum 68. The upper end of rod 82 is inserted through apertured guide 83. Guide 83 is suitably secured to the extension 28 which is on the same side of the tug as the ratchet wheel 70. The spring biasing element 84 is utilized to help maintain the pawl 74 in a given position. Crank 80 and pawl 74 can be made independently movable and interconnected by a spring 84. A suitable motor (having a reversible output), chain and sprocket wheel (none of which are shown in the drawings) can replace the ratchet wheel 70 and pawl 74.

Matching cams 86 are provided on the outer lateral surfaces of drum carriage sleeves 58 and are secured thereto as by welding. Ramped levers 88 are provided for interaction with cams 86 and are pivotally secured to lever mounts 90 by pins 92. Lever mounts 90 include sleeve portions 94 which are adapted to be slidable on lower frame extensions 28. Ramped levers 88 are maintained to the outer lateral sides of extensions 28. Bolts or other suitable means 95, are insertable through apertures in sleeve portions 94 and lower frame extensions 28 to secure the same.

The lower ends of ramped levers 88 are tapered so as to be insertable in apertures (not shown in the drawings) of axle engaging inserts 96. Axle inserts 96 ride in collars 98 which are welded to protrusions 100. Protrusions 100 may be extended upwardly into the hollow lower frame extensions 28 and are apertured so that bolts 95 may be used to maintain lever mounts 90, ramped levers 88, axle engaging inserts 96, and collars 98 operatively interrelated at the lower end of tug 10. Springs or other suitable biasing elements 110 are provided between the protrusions 100 and the ramped levers 88 at a point generally intermediate pins 92 and axle engaging inserts 96. Thus, automatic retraction of the axle engaging inserts 96 can be guaranteed without direct manual manipulation thereof.

Drum 68 is provided with a slip resistant covering 112 for engagement with the tire of the aircraft nosewheel. Similarly a rubber slip resistant sheath 114 is provided on cross member 24 of the frame portion 18 so as to facilitate the usage of the same as a handle during ground maneuvering operations when the tug 10 is on the aircraft.

To assemble the present invention, the individual component elements and subassemblies are first fabricated and interengaged. Lever arm carriage 38 is first coupled with lower frame extensions 28 and secured thereto to by bolts 44. Lever arm 46 and pushrod 50 are then operatively associated therewith as previously described. Drum carriage assembly 56, with drum 68 and other appertinent elements mounted thereon, is then slid over the bottom end of lower frame assembly extensions 28. Pushrod 50 and cross member 60 are then connected. Rod 82 is slid through the aperture of guide 83 and attached to crank 80 so that the pawl 74 and rachet 70 may be operated. The ramped levers 88 with mountings 90 are then slid over the bottom of spaced extensions 28. Axle engaging inserts 96, biasing elements 110 and collars 98 are then operatively associated with the ramped levers 88 as previously described, and secured in place by bolts 95. Upper frame portion 18 is then operably associated with lower frame portion 20 as previously described, and secured relative thereto by biasing elements 32 and studs 30.

Figure 2:
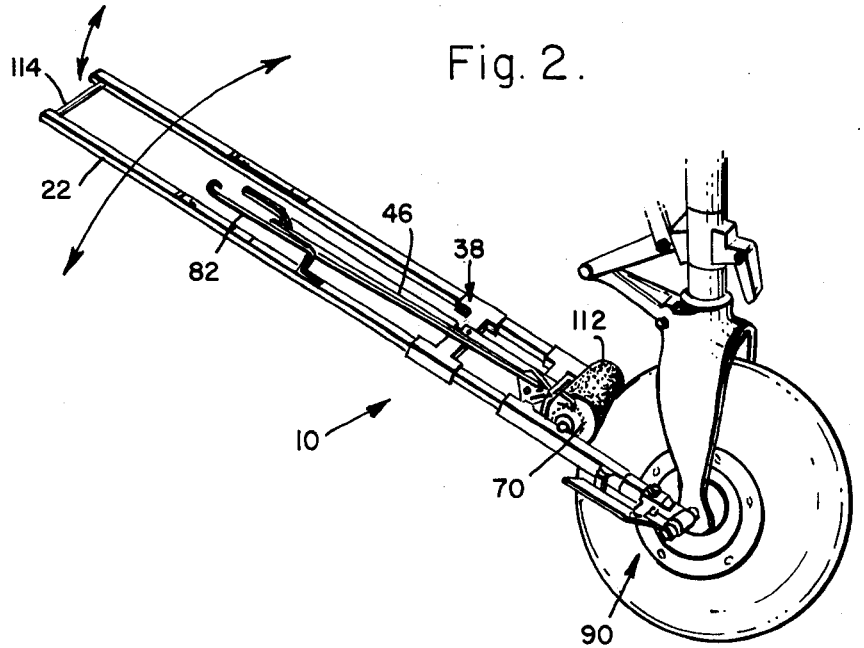
FIG. 2 is a perspective view of the aircraft tug and nosewheel of FIG. 1.

In operation the lever arm 46 is retracted to the position shown in FIG. 3 so that axle engaging inserts 96 are in the position shown to allow clearance on either side of the aircraft nosewheel. When the lever arm 46 is in the FIG. 3 position, the drum carriage 56 has been moved upwardly on the extensions 28 so that drum 68 will not engage the wheel of the aircraft. The tug 10 is then oriented with the nosewheel of the aircraft as shown in FIGS. 1 and 2 and lever arm 46 is moved in the direction shown by the arrows in FIG. 3 to the position shown in FIG. 4. This causes pushrod 50 to move generally linearly downward and alters the position of drum carriage 56 relative to extensions 28. Thus the axle engaging inserts 96 are moved into the hollowed ends of the nosewheel axle of the airplane through the interaction of cams 86 and ramped levers 88. Nearly simultaneously, drum 68 is moved into a nosewheel engaging position as shown in FIGS. 1, 2 and 4.

With the tug 10 thus situated and the pawl 74 positioned to control the rotation of the drum 68 in a desired direction, continuous up and down movement of the tug 10, about the axis of nosewheel rotation caused controlled incremental movement of the plane across the ground. Horizontal movement of the tug 10 about the axis of the aircraft landing gear upright support points the nosewheel so that a single person can both steer and move the aircraft without assistance and without any source of power except human manipulation. However, it should be understood that motorized versions of the present invention can be used.

Special care should be taken to maintain the aircraft tires sufficiently inflated so that slippage of drum 68 on the tire surface is minimized. It should also be understood that adjustment of the position of pin 62 in slot 61 of the push rod 50, may be utilized to accomodate tires of different radii and wear condition (adjustment of the alternative turnbuckle may also be utilized to accomplish this result).

When the aircraft is located in the desired location, the lever arm 46 need only be moved back to the FIG. 3 position to disengage the drum 68 from the nosewheel of the aircraft. Nearly simultaneously, the cams 86 are moved out of engagement with the ramped levers 88 and the action of biasing elements 110 on the ramped levers 88 forces the axle insets 96 into the retracted position of FIG. 3. Thus the tug 10 may be removed from the aircraft and stowed thereaboard for future use.

Conspicuously absent from the hand operated tug of the present invention are the separate ground traversing wheels and power sources of the type which made prior art tugs impractical for onboard transport. The structure of the tug of the present invention thus makes available to the solo pilot a lightweight, compact tug 10 which takes full advantage of the inherent structural features of the aircraft to minimize the number of component elements of the tug and allows a single individual to both move and steer an aircraft when it is on the ground.

It is to be understood that the above-described embodiments are merely illustrative of some of the many specific embodiments which represent applications of the principles of the present invention. Clearly, numerous and varied other arrangements may readily be devised by those skilled in the art without departing from the spirit and scope of the invention.

What is claimed is:

1. A tug of the type which may be used by a single individual to both move and steer a craft on the ground which craft has a nosewheel rotatable about an axle, the axle being fixed relative to an upright support which may be rotated about its axis to permit pointing of the nosewheel and thus steering of the craft, comprising:
    an elongated support frame;
    motive means operably associated with said frame to be selectively engageable with the nosewheel of the craft and controllably drivable for rotating the nosewheel in a desired direction about the nosewheel axle to thus controllably move the craft across the ground, comprising:
        (a) a drive carriage mounted upon said frame for reciprocable movement thereon;
        (b) a conrollably rotatable drum means mounted upon said drive carriage to move therewith for engagement with the nosewheel; and
        (c) means for controlling the direction of rotation of the drum means and thus the nosewheel;
    means operably associated with said frame for controlling the movement of said drive carriage on said frame; and thus movement of the drum means into and out of the nosewheel engaging position; and
    means operably associated with said frame and selectively and retractably movable into an axle engaging position for securing the frame relative to the nosewheel axle to make steering of the craft possible through movement of the frame about the axis of the upright support and to maintain the drum means in a nosewheel engagable and driving position, comprising:
        (a) cam means operably associated with said drive carriage to be movable therewith;
        (b) a pivoted lever operably associated with said frame and cam means to be selectively pivoted in response to movement of said drive carriage and cam means; and
        (c) an axle engager operably associated with the lever for movement into a position of engagement with the axle when the cam is in a first position and out of engagement with the axle when the cam is in a second position.

2. The tug of claim 1, said means for controlling the direction of rotation of the drum means comprising: selectively reversible pawl and ratchet wheel means operably associated with the drum means to control the rotational direction thereof and therefore the movement of the craft as a result of the movement of the frame about the axle of the nosewheel.

3. The tug of claim 2, said pawl and ratchet wheel means being mounted on said drive carriage.

4. The tug of claim 1, further including biasing means operably associated with said pivoted lever for assuring automatic retraction of the axle engager from the axle engaging position when the cam is in the second position.

5. The tug of claim 4 wherein the cam means is in the first position when the drum means is in position for engagement with the nosewheel.

6. The tug of claim 1, wherein the cam means is in the first position when the drum means is in position for engagement with the nosewheel.

7. The tug of claim 1, said means for controlling the movement of said drive carriage, comprising:
   a lever arm operably associated with said frame to pivot about a point fixed with respect to said frame; and
   a pushrod pivotally interconnected with both said lever arm and drive carriage to cause movement of the drive carriage on the frame with movement of the lever arm.

8. The tug of claim 7, said means for controlling movement further including: a lever arm carriage secured to the frame, said lever arm being pivotally interconnected to the lever arm carriage.

9. The tug of claim 1, including means for adjusting the relative positions of said means for controlling movement of the drive carriage to the drive carriage to accomodate nosewheels of different radii.

10. The tug of claim 7 including means for controlling the relative position of said pushrod and drive carriage to accomodate nosewheels of different radii.

11. The tug of claim 1, including means for telescoping the frame to allow for length adjustment.

12. A tug of the type which may be used by a single individual to both move and steer a craft on the ground which craft has a nosewheel rotatable about an axle, the axle being fixed relative to an upright support which may be rotated about its axis to permit pointing of the nosewheel and thus steering of the aircraft comprising:
   an elongated supporting frame;
   motive means operably associated with said frame to be selectively engagable with the nosewheel of the craft and controllably drivable for rotating the nosewheel in a desired direction about the nosewheel axle to thus controllably move the craft across the ground, comprising:
   (a) a drive carriage mounted upon said frame for reciprocable movement thereon;
   (b) a controllably rotatable drum means mounted upon said drive carriage to move therewith for engagement with the nosewheel; and
   (c) selectively reversible pawl and ratchet wheel means operably associated with the drum means for controlling the rotation thereof to thereby control movement of the craft across the ground as a result of movement of the frame about the nosewheel axle;
   means operably associated with said frame for controlling the movement of said drive carriage on said frame and thus movement of the drum means into and out of the nosewheel engaging position, comprising:
   (a) a lever arm carriage fixed to said frame;
   (b) a lever arm pivotally interconnected to the lever arm carriage;
   (c) a pushrod pivotally interconnected to both said lever arm and drive carriage to cause movement of said drive carriage on the frame with movement of the lever arm; and
   means operably associated with said frame and selectively and retractably movable into an axle engaging position for securing the frame relative to the nosewheel axle to make steering of the craft possible through movement of the frame about the axis of the upright support and to maintain the drum means in the nosewheel engagable and drivable position, comprising:
   (a) cam means operably associated with said drive carriage to be movable therewith;
   (b) a pivoted lever operably associated with said frame and cam means to be selectively pivoted in response to movement of the drive carriage and cam means;
   (c) an axle engager operably associated with the pivoted lever for movement into a position of engagement with the axle when the drum means is in the nosewheel engaging position as a result of movement of the lever arm and cam to a first position, and for movement into a position of disengagement with the axle when the drum means is moved out of the nosewheel engaging position and the cam is moved to a second position as a result of movement of the lever arm; and
   (d) biasing means operably associated with said pivoted lever for assuring automatic retraction of the axle engager from the axle engagement position when the cam is in the second position.

13. The tug of claim 12 including means for adjusting the relative position of said pushrod and drive carriage to accomodate nosewheels of different radii.

14. The tug of claim 13 including means for telescoping the frame to allow for length of adjustment.

15. A tug of the type which may be used by a single individual to both move and steer a craft on the ground which craft has a steerable wheel rotatable about an axle, the axle being generally fixed for relative movement in a plane parallel to the ground to permit pointing of the steerable wheel and thus steering of the craft, comprising:
   an elongated support frame;
   motive means operably associated with said frame to be selectively engagable with the steerable wheel of the craft and controllably drivable for rotating the steerable wheel in a desired direction about the axle to thus controllably move the craft across the ground, comprising:
   (a) a drive carriage mounted upon said frame for reciprocable movement thereon;
   (b) a controllably rotatable drum means mounted upon said drive carriage to move therewith for engagement with the steerable wheel; and
   (c) means for controlling the direction of rotation of the drum means and thus the steerable wheel;
   means operably associated with said frame for controlling the movement of said drive carriage on said frame and thus movement of the drum means into and out of the steerable wheel engaging position; and means operably associated with said frame and selectively and retractably movable into an axle engaging position for securing the frame relative to the axle to make steering of the craft possible by moving the axle in the plane parallel to the ground and to maintain the drum means in a steerable wheel engaging and driving position, comprising:

(a) cam means operably associated with said drive carriage to be movable therewith;

(b) a pivoted lever operably associated with said frame and cam means to be selectively pivoted in response to movement of said drive carriage and cam means; and (c) an axle engager operably associated with the lever for movement into a position of engagement with the axle when the cam is in a first position and out of engagement with the axle when the cam is in a second position.

16. The tug of claim 15, further including biasing means operably associated with said pivoted lever for assuring automatic retraction of the axle engager from the axle engaging position when the cam is in the second position.

17. The tug of claim 16 wherein the cam means is in the first position when the drum means is in position for engagement with the steerable wheel.

18. The tub of claim 15, wherein the cam means is in the first position when the drum means is in position for engagement with the steerable wheel.

19. The tug of claim 15, including means for adjusting the relative positions of said means for controlling movement of the drive carriage to the drive carriage to accomodate steerable wheels of different radii.

* * * * *